(12) United States Patent
Shibata

(10) Patent No.: US 9,992,380 B2
(45) Date of Patent: Jun. 5, 2018

(54) COLOR VERIFICATION SYSTEM AND COMPUTER-READABLE RECORDING MEDIUM STORING PROGRAM

(71) Applicant: Konica Minolta, Inc., Chiyoda-ku, Tokyo (JP)

(72) Inventor: Kuniyasu Shibata, Kawasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/236,871

(22) Filed: Aug. 15, 2016

(65) Prior Publication Data
US 2017/0054877 A1 Feb. 23, 2017

(30) Foreign Application Priority Data
Aug. 17, 2015 (JP) .................. 2015-160359

(51) Int. Cl.
*G06K 15/00* (2006.01)
*H04N 1/40* (2006.01)
*H04N 1/60* (2006.01)
*H04N 1/00* (2006.01)
*G06F 3/12* (2006.01)

(52) U.S. Cl.
CPC ......... *H04N 1/6019* (2013.01); *G06F 3/1208* (2013.01); *G06F 3/1244* (2013.01); *G06F 3/1248* (2013.01); *G06F 3/1285* (2013.01); *H04N 1/00023* (2013.01); *H04N 1/00034* (2013.01); *H04N 1/00058* (2013.01); *H04N 1/00087* (2013.01); *H04N 1/6008* (2013.01); *H04N 1/6013* (2013.01); *H04N 1/6033* (2013.01); *H04N 1/6072* (2013.01)

(58) Field of Classification Search
USPC .................. 358/2.1, 1.9, 1.15, 518
See application file for complete search history.

(56) References Cited

U.S. PATENT DOCUMENTS

2009/0116063 A1* 5/2009 Takashima ............. G06K 15/02
358/1.15
2011/0273733 A1* 11/2011 Moriyama ............. H04N 1/603
358/1.9
2014/0368840 A1 12/2014 Shimizu

FOREIGN PATENT DOCUMENTS

JP 2015-000516 A 1/2015

* cited by examiner

*Primary Examiner* — Quang N Vo
(74) *Attorney, Agent, or Firm* — Buchanan Ingersoll & Rooney PC

(57) ABSTRACT

A color verification system of an aspect of the present invention includes an information processing apparatus that generates a job and an image forming apparatus that forms a color image on a sheet on the basis of the job. The information processing apparatus includes a storage portion that stores: information of the image forming apparatus under management; and target information including a target profile set to the image forming apparatus. Furthermore, when a plurality of different target profiles is set to the image forming apparatus, the information processing apparatus includes a job generation portion that generates the job: including image data containing a plurality of color verification images associated with the plurality of target profiles, respectively; and including an output setting.

15 Claims, 13 Drawing Sheets

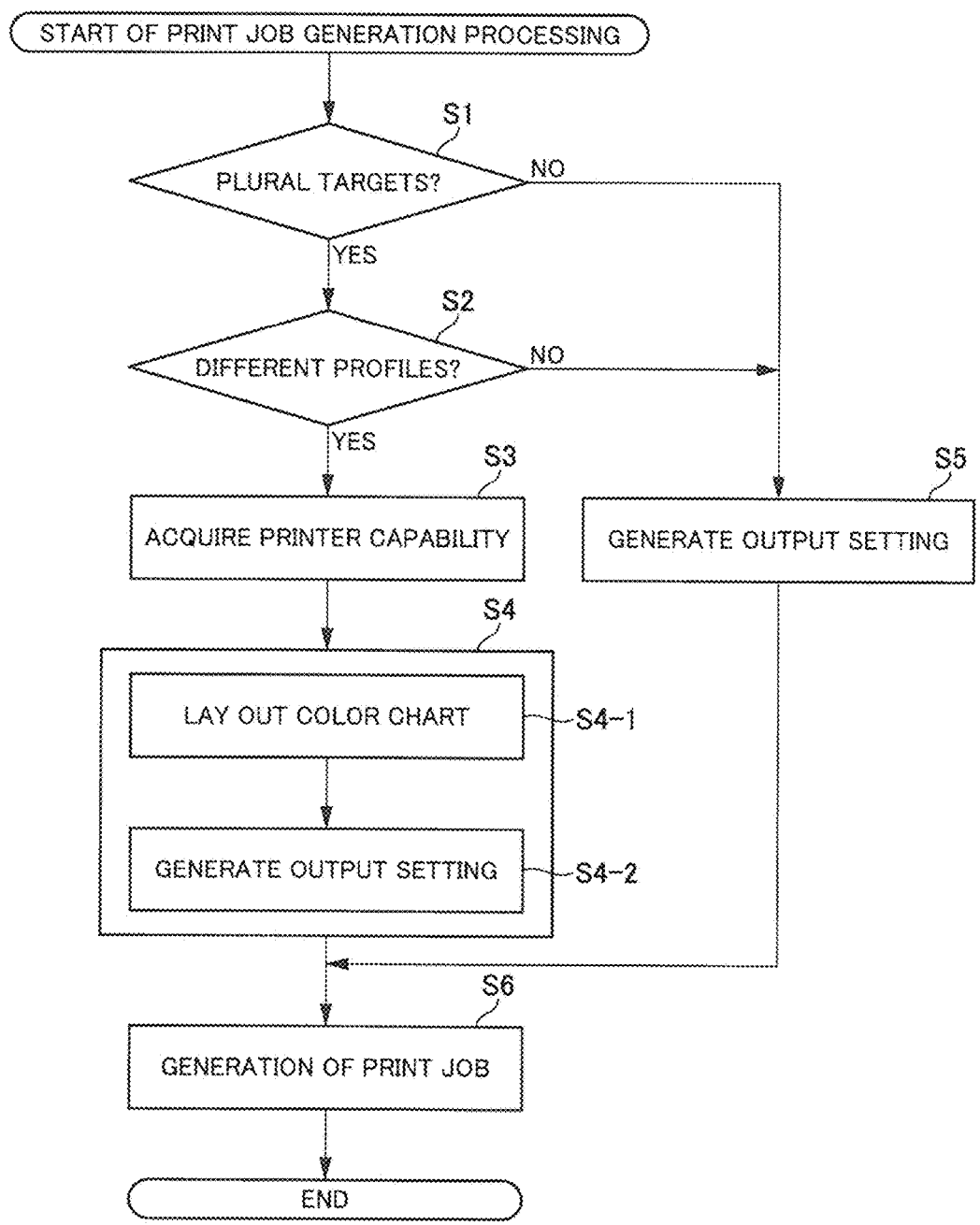

```
%-12345X@PJL
@PJL SET COPIES=1
@PJL SET TEXT="Target1"
@PJL SET GRAPHICS="Target2"
@PJL SET IMAGE="Target3"
@PJL SET VALIDATION=TRUE
...

%PDF
...

%%EOF
%-12345X
```

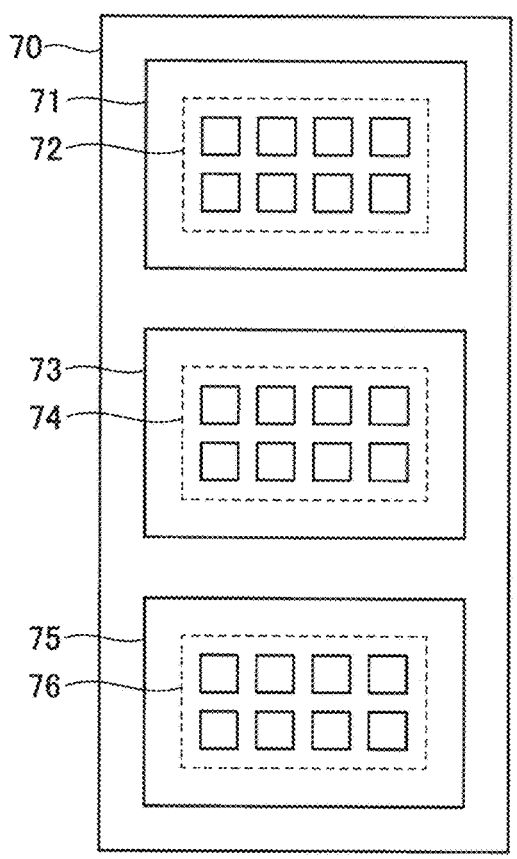

COLOR VERIFICATION SYSTEM AND COMPUTER-READABLE RECORDING MEDIUM STORING PROGRAM

BACKGROUND OF THE INVENTION

Field of the Invention

The present invention relates to a color verification system to verify the color of an image formed on a sheet by an image forming apparatus in which a plurality of profile information sets is set, and a computer-readable recording medium storing a program.

Description of the Related Art

Conventionally, for the state of a color (output color) of an image formed on a sheet by a printer, there is known a method of managing quality (color verification) by reading a color chart printed on a sheet in the printer through the use of a colorimeter.

Patent Literature 1 discloses a technique of laying out a color chart on PDL data on the basis of a sheet size as such a color verification technique.

RELATED ART DOCUMENT

Patent Document

Patent Literature 1: Japanese Patent Laid-Open Publication No. 2015-000516

DISCLOSURE OF THE INVENTION

Problems to be Solved by the Invention

A printer forms an image on a sheet using registered target information (color conversion table such as a target profile). Generally, although a standard profile such as Japan Color is used as the target profile, the target profile is sometimes created independently by a user. Furthermore, a plurality of target profiles is sometimes set for one printer. When the plurality of target profiles is to be verified, the same operation (color verification) needs to be performed a plurality of times. Moreover, every time the color verification is performed, a click charge depending on sheet consumption and the number of clicks is generated.

Since the technique of Patent Literature 1 performs the whole processing using the same target profile even when a plurality of color charts is arranged on the same sheet, it is not possible to verify the plurality of target profiles at the same time.

From the above situation, there is desired a method of verifying the plurality of target profiles at the same time when the plurality of color charts is arranged on the same sheet.

SUMMARY OF THE INVENTION

Means for Solving the Problem

A color verification system in an aspect of the present invention includes an information processing apparatus that generates a job and an image forming apparatus that forms a color image on a sheet on the basis of the job.

The information processing apparatus includes a storage portion and a job generation portion.

The storage portion stores: information of the image forming apparatus under the management of the information processing apparatus; and target information including a target profile set to the image forming apparatus.

When a plurality of different target profiles is set to the image forming apparatus, the job generation portion generates a color verification job: including image data containing a plurality of color verification images associated with a plurality of target profiles, respectively; and including an output setting.

BRIEF DESCRIPTION OF THE DRAWINGS

FIG. 10 is a flowchart showing an example of print job generation processing according to an embodiment of the present invention.

FIG. 16 is a diagram showing an arrangement example of a color chart in the second example of print job generation preparation processing according to the embodiment of the present invention.

FIG. 17 is a diagram showing a PJL output setting example in the second example of print job generation preparation processing according to the embodiment of the present invention.

DESCRIPTION OF THE PREFERRED EMBODIMENTS

Hereinafter, examples of a mode for carrying out the present invention will be explained with reference to the attached drawings. Note that, in each of the drawings, the same sign is attached to a constituent having substantially the same function or configuration, and duplicated explanation will be omitted.

[Entire Configuration of a Color Verification System]

First, the entire configuration of a color verification system according to an embodiment of the present invention will be explained.

Figure 1:
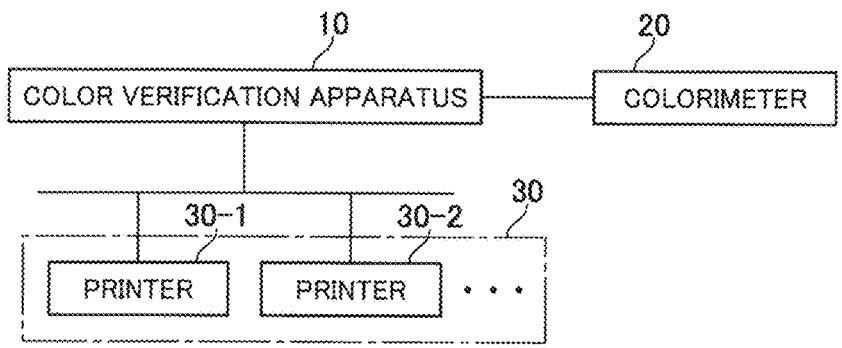
FIG. 1 is a diagram showing an entire configuration example of a color verification system according to an embodiment of the present invention.

FIG. 1 is a diagram showing an entire configuration example of the color verification system according to an embodiment of the present invention.

The color verification system 1 shown in FIG. 1 includes a color verification apparatus 10 (one example of an information processing apparatus), a colorimeter 20, and a printer group 30. The color verification apparatus 10 is connected with the colorimeter 20 and the printer group 30, and manages printers 30-1 and 30-2 (examples of an image forming apparatus) constituting the printer group 30. Each of the printers 30-1 and 30-2 is a color printer that outputs a color image.

In the color verification system 1, the color verification apparatus 10 generates a job for executing color verification, and outputs the job to the printers 30-1 and 30-2 constituting the printer group 30. Furthermore, each of the printers 30-1 and 30-2 forms a color image on a sheet on the basis of the job received from the color verification apparatus 10. Then, the sheet on which the color image is formed is set to the colorimeter 20. The colorimeter 20 measures the color of the color image on the sheet and outputs the colorimetry result to the color verification apparatus 10. After that, the color verification apparatus 10 determines the color image on the basis of the colorimetry result.

Note that the color verification system 1 may not always include the colorimeter 20. Furthermore, the printer group 30, while being constituted of the two printers 30-1 and 30-2 in FIG. 1, may be constituted of three or more printers.

[Internal Configuration of the Color Verification Apparatus]

Next, the internal configuration of the color verification apparatus 10 will be explained.

Figure 2:
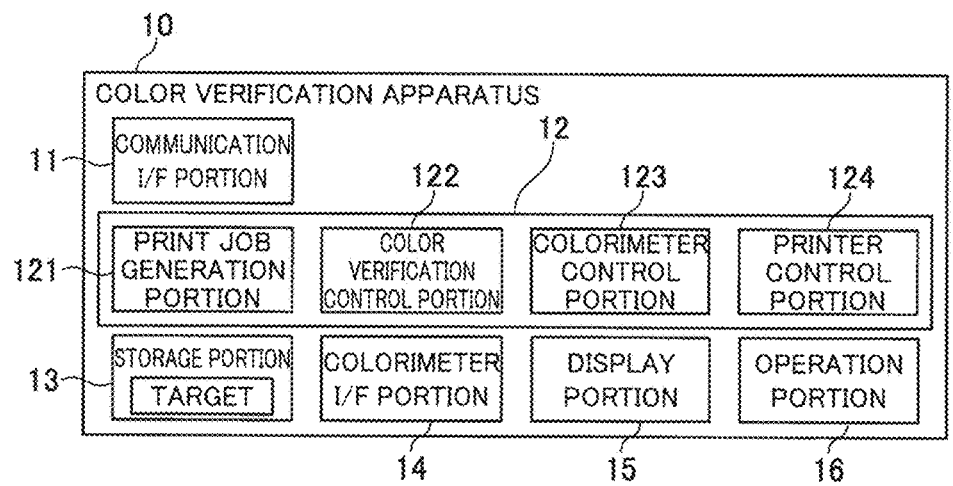
FIG. 2 is a block diagram showing an internal configuration example of a color verification apparatus according to an embodiment of the present invention.

FIG. 2 is a block diagram showing an internal configuration example of the color verification apparatus 10.

The color verification apparatus 10 includes a communication I/F portion 11, a control portion 12, a storage portion 13, and a colorimeter I/F portion 14, a display portion 15, and an operation portion 16. A personal computer (PC) may be used as the color verification apparatus 10.

The communication I/F portion 11 is an interface that performs transmission/reception to/from the printers 30-1 and 30-2 via a network. For example, a NIC (Network Interface Card) is used as the communication I/F portion 11.

The control portion 12 includes a print job generation portion 121, a color verification control portion 122, a colorimeter control portion 123, and a printer control portion 124. An arithmetic processing apparatus such as a CPU (Central Processing Unit) is used as the control portion 12. The function of each portion in the control portion 12 is realized by the CPU executing a program stored in the storage portion 13. The program may be stored in an unillustrated ROM (Read Only Memory).

The print job generation portion 121 generates a print job including a color verification image and an output setting of the color verification image, and outputs the print job to the printers 30-1 and 30-2. Specifically, the print job generation portion 121 determines whether or not a plurality of different target profiles is set to the printer of a color verification target. Then, when the plurality of different target profiles is set, the print job generation portion 121 generates a print job: including a color verification image constituted of a plurality of images associated with the plurality of target profiles; and including an output setting. A color chart of a predetermined color pattern image is used for the image constituting the color verification image. In the following explanation, the print job including the color verification image is sometimes described as "color verification job".

The color verification control portion 122 acquires a colorimetry result from the colorimeter 20 via the colorimeter I/F portion 14, and performs color verification processing (refer to FIG. 21) on the basis of the colorimetry result.

The colorimeter control portion 123 controls the operation of the colorimeter 20 via the colorimeter I/F portion 14.

The printer control portion 124 is application software such as a printer driver and a hot folder which perform print job transmission. The printer driver converts a document instructed to be printed from a document generation application into a language readable by the printers 30-1 and 30-2 (PDL such as PCL (Printer Control Language) and PostScript). The hot folder activates print operation (image formation processing) when a color chart is input, as one example.

The storage portion 13 is a non-volatile storage portion, and the storage portion 13 stores: a program to be executed by the CPU in the control portion 12; data to be used by the program; and the like. Furthermore, the storage portion 13 stores target information being registered in the printers 30-1 and 30-2 and including at least a target profile to be described below. A semiconductor memory or an HDD is used in the storage portion 13.

The colorimeter I/F portion 14 is connected to the colorimeter via a dedicated signal line, and performs transmission/reception to/from the colorimeter 20.

The display portion 15 is constituted of a display monitor or the like, and displays an output setting screen, a GUI screen of an application, and the like.

The operation portion 16 is constituted of a keyboard, a mouse, and the like. A user can perform print instruction and output setting on the printers 30-1 and 30-2 by operating the operation portion 16 while observing a screen displayed on the display portion 15.

[Target Information]

Next, the target information will be explained with reference to FIG. 3.

Figure 3:
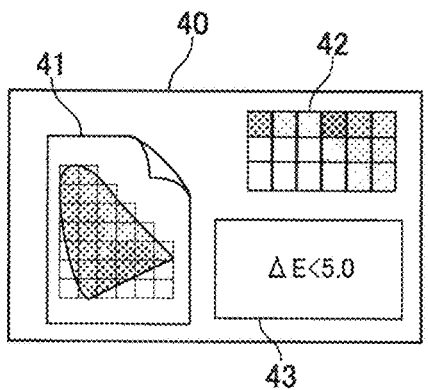
FIG. 3 is an explanatory diagram of target information.

FIG. 3 is an explanatory diagram of the target information.

As shown in FIG. 3, generally, the target information 40 is constituted of a target profile 41, a color chart 42, and a color difference allowance width 43. The target profile 41 is used for adjusting the output color of the printer that outputs a color image (CMYK printer) so as to be a desirable color. Here, CMYK is an output color of the printer, and indicates four colors of three CMY basic colors (cyan, magenta, and yellow) and a K color (black). A color conversion table (LUT: Look Up Table) is used for the conversion from some CMYK value into a desirable CMYK value. Namely, it is necessary to preliminarily create a color conversion table for the conversion from a CMYK value into another CMYK value (hereinafter, described as "CMYK-CMYK color conversion table").

In order to create a color conversion table (CMYK-CMYK color conversion table) which records desirable color conversion for converting a CMYK value into another CMYK value, there is generally used a method of combining a target CMYK-L*a*b* color conversion table and an L*a*b*-CMYK color conversion table of an output device to thereby create the same. Generally, a standard color space such as Japan Color is used as the target. Here, L*a*b* is a color system not depending on the device, and an L*a*b* value in the CMYK-L*a*b* color conversion table is a colorimetric value. The CMYK-L*a*b* color conversion table corresponds to the target profile 41. In the present embodiment, the three target information sets are registered in each of the printers 30-1 and 30-2.

Figure 4A:
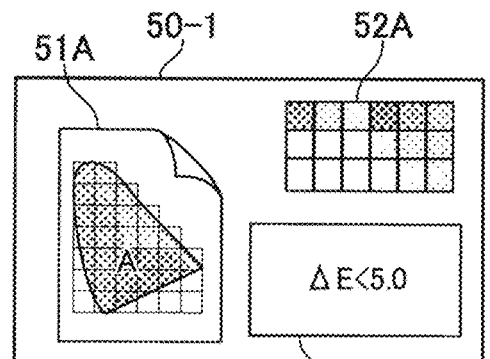
FIGS. 4A, 4B, and 4C are explanatory diagrams of three target information sets set in a printer.
Figure 4B:
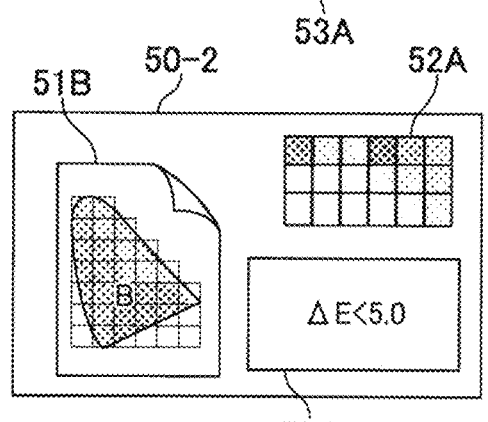
Figure 4C:
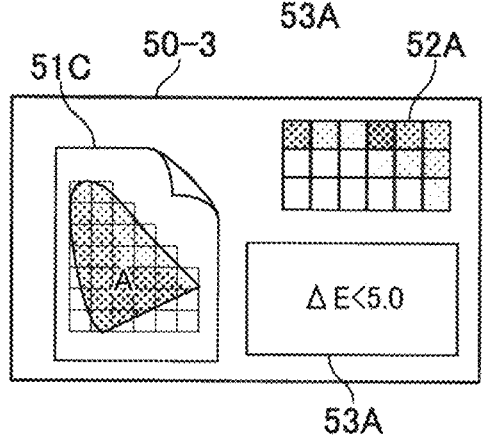

FIGS. 4A, 4B, and 4C are explanatory diagrams of the three target information sets set in each of the printers 30-1 and 30-2.

The respective target information sets 50-1 to 50-3 shown in FIGS. 4A, 4B, and 4C are target information sets different from each other. The target information 50-1 in FIG. 4A includes a target profile 51A, a color chart 52A, and a color difference allowance width 53A. The target information 50-2 in FIG. 4B includes a target profile 51B, a color chart 52A, and a color difference allowance width 53A. Furthermore, the target information 50-3 in FIG. 4C includes a target profile 51C, a color chart 52A, and a color difference allowance width 53A. In this way, the respective target information sets 50-1 to 50-3 include target profiles 51A to 51C different from each other. Note that, even when including the same target profile, the target information including a different color chart or color difference allowance width is different target information. The same color chart is generally used among the plurality of target information sets in order to cause the color verification conditions to be equal.

[Color Conversion Table]

Here, the color conversion table will be explained with reference to FIG. 5 and FIG. 6.

Figure 5:
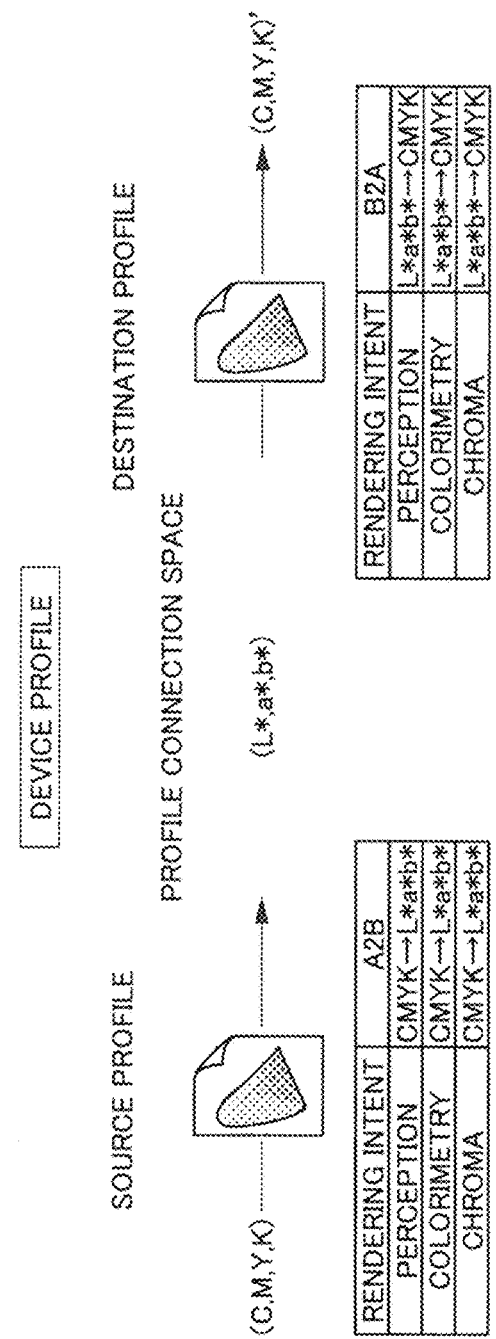
FIG. 5 is an explanatory diagram showing a flow of color conversion processing using a device profile.

FIG. 5 is an explanatory diagram showing a flow of color conversion processing using a device profile.

Figure 6:
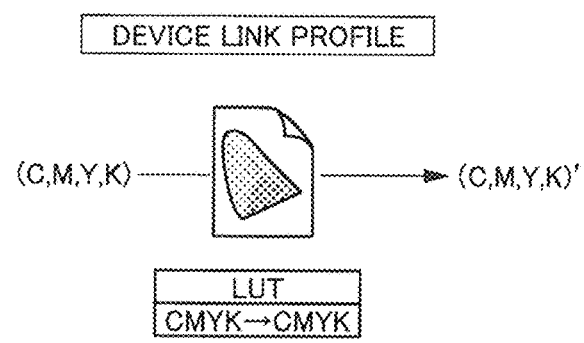
FIG. 6 is an explanatory diagram showing a flow of color conversion processing using a device link profile.

FIG. 6 is an explanatory diagram showing a flow of the color conversion processing using a device link profile.

Each of the above profiles indicates a color conversion table. Among the profiles, an ICC profile is widely used not only in the printing industry but also in the IT (Information Technology) industry and becomes a substantially de facto standard. Hereinafter, explanation will be given using the ICC profile as an example. The color management of the ICC profile is largely classified into the following two methods.

Method of using a device profile (hereinafter, described as "DP")

Method of using a device link profile (hereinafter, described as "DLP")

(Case of the Device Profile (DP))

A device value (CMYK value, RGB value, or the like) is a value depending on a device type, and the DP is a profile associating the device value with a device-independent value (XYZ value or L*a*b* value). The DP is constituted of an LUT from a device value to a device-independent value and an LUT from the device-independent value to a device value. For example, in the case of the DP of a CMYK printer, the DP is constituted of an LUT that converts the CMYK (first color space) into L*a*b* (second color space) (A2B table: first color conversion table) and an LUT that converts L*a*b* (second color space) into CMYK (third color space) (B2A table: second color conversion table). The device-independent value is a color space connecting the profiles and is referred to as a profile connection space (PCS).

Note that, in the DP, it is possible to select a rendering intent depending on a difference in a color reproduction policy. The kinds of the rendering intent include, for example, perception, colorimetry, and chroma, and an LUT is prepared for each kind of the rendering intents. In this case, the DP has three kinds of LUT. Then, at the time of the color conversion, one of the rendering intents is selected therefrom and an LUT associated with the rendering intent is used.

A target device DP becomes necessary for the color conversion, and the device DP is referred to as a source profile (sometimes referred to as a target profile). For example, a profile of an offset printing machine and a standard profile such as Japan Color is selected as the source profile. Then, the DP of the output device is referred to as a destination profile (sometimes referred to as a printer profile). A profile of a printer that actually outputs a print (e.g., printer 30-1 or 30-2) is selected as the profile. Then, an input CMYK value becomes a device-independent value through the A2B table of a source profile, and is converted into another CMYK value through the B2A table of a destination profile.

It is possible to output, from the printer (destination), a CMYK value (C, M, Y, and K)' corresponding to a target CMYK value (C, M, Y, and K) of the device (source, through the two stage conversion as in the flow of the color conversion processing using the device profile (DP) shown in FIG. 5.

(Case of Device Link Profile (DLP))

The DLP is a profile obtained by integrating, into one LUT, the information for performing: the color conversion process using the above DP, namely, the conversion of the device value, the device-independent value, and then the device value. That is, the DLP is an LUT obtained by associating the input device value with the output device value. The DLP is created by integration of the device profile (source profile) of the input device and the device profile of the output device (printer 30-1, 30-2 or the like) (destination profile). When the DLP is used for the color conversion, the processing at the time of color conversion in color management is performed at one time. When the conversion of, for example, the CMYK of some device (first color space) into the CMYK of another device (third color space) is performed, the conversion into the device-independent color space (three-dimensional L*a*b* or the like) is not necessary, and thus information loss becomes smaller (when black print information or the like is desired to be left).

In the case of the device link profile (DLP) as shown in FIG. 6, the concept of rendering intent does not exist and there is only one LUT. Accordingly, it is possible to directly output the target CMYK value (C, M, Y, and K)' by applying the LUT of the device link profile to the input CMYK value (C, M, Y, and K).

[Internal Configuration of the Printer]

Figure 7:
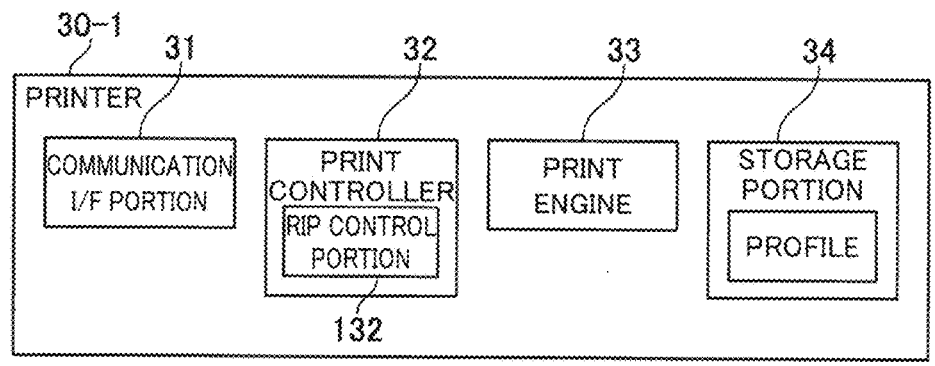
FIG. 7 is a block diagram showing an internal configuration example of a printer according to an embodiment of the present invention.

FIG. 7 is a block diagram showing an internal configuration example of the printer 30-1. The internal configurations of the printers 30-1 and 30-2 are the same, and the printer 30-1 will be explained as a representative.

The printer 30-1 includes a communication I/F portion 31, a print controller 32, a print engine 33, and a storage portion 34.

The communication I/F portion 31 is an interface that performs transmission/reception to/from the color verification apparatus 10 via a network. A NIC is used as the communication I/F portion 31, for example.

The print controller 32 is an example of a control portion and includes a RIP control portion 132. An arithmetic processing apparatus such as a CPU is used as the print controller 32. The function of the print controller 32 is realized by the CPU executing a program stored in the storage portion 34. The program also may be stored in an unillustrated ROM.

The RIP control portion 132 performs language analysis, rasterizing processing (e.g., RIP (Raster Image Processor) processing), color conversion, and attribute information generation. The RIP control portion 132 develops the PDL data into a tag bit plane 35 (refer to FIG. 8 to be described below), and a C plane 36c, an M plane 36m, a Y plane 36y, and a K plane 36k (hereinafter, sometimes generally referred to as CMYK plane 36). The C plane 36c, the M plane 36m, the Y plane 36y, and the K plane 36k are bit map image data sets of cyan (C), magenta (M), yellow (Y), and black (K), respectively, and are used as an example of image formation data.

The tag bit plane 35 is used for determining the object type of the CMYK plane 36. The tag bit plane 35 is output from the print controller 32 to the print engine 33 together with the CMYK plane 36.

The print engine 33 is an example of an image forming portion, and performs processing of forming an image on a sheet (print) on the basis of an instruction of the print controller 32. For example, the print engine 33 forms a color image by overlapping images of four CMYK colors.

The storage portion 34 stores the device profile (DP) shown in FIG. 5 or the device link profile (DLP) shown in FIG. 6.

[CMYK Plane and Tag Bit Plane]

Next, the CMYK plane 36 and the tag bit plane 35 will be explained. As described above, the RIP control portion 132 of the print controller 32 performs the RIP processing for the color verification image according to the output setting included in the PDL data received from the color verification apparatus 10. In the RIP processing, the RIP control portion 132 determines a portion of the color verification image where character data is embedded to be a character region, and determines a portion where photograph data is embedded to be a photograph region. Then, the RIP control portion 132 outputs, to the printers 30-1 and 30-2, the tag bit plane 35 corresponding to the object type (character object, graphic object, or image object) of each region included in the color verification image in addition to the CMYK plane 36 generated from the color verification image. When the printer 30-1 or 30-2 executes print, appropriate image processing (change in the type of a tone curve, thinning processing, or the like) is performed on the CMYK plane 36 on the basis of the tag bit attached to each pixel included in the tag bit plane 35, and thus print quality is enhanced.

Figure 8:
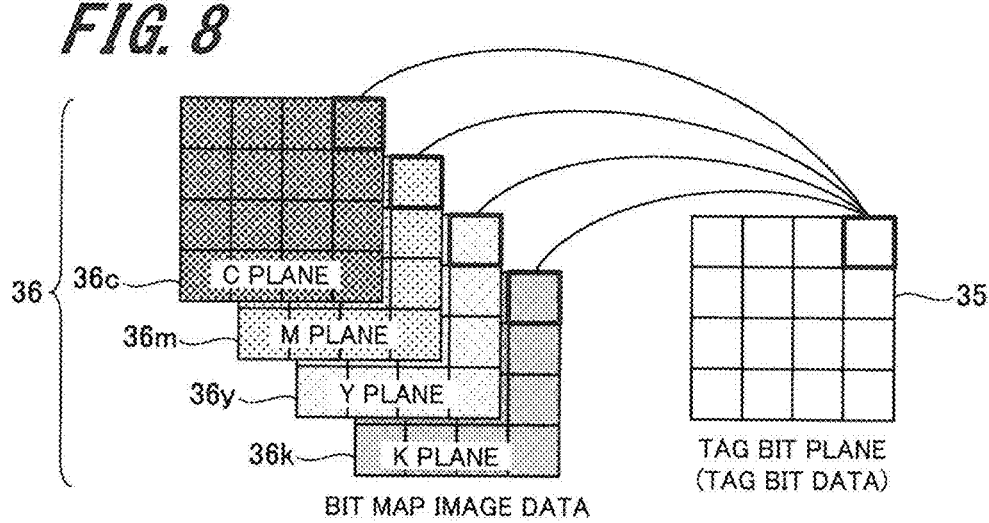
FIG. 8 is a conceptual diagram showing an example of tag bit data (attribute information data).

FIG. 8 is a conceptual diagram showing an example of tag bit data (attribute information data).

The tag bit data is a data showing attribute information for each pixel in bit map image data generated when the print controller 32 performs the RIP processing on the color verification image. One plane of the tag bit data for the tag bit plane 35 is generated by the RIP control portion 132 of the print controller 32, for the bit map image data constituted of the CMYK planes 36. A pixel at a specific position in the CMYK plane 36 coincides with a pixel at a specific position in the tag bit plane 35.

[Relationship Between the Bit Map Image Data and the Tag Bit Data]

Figures 9A, 9B:
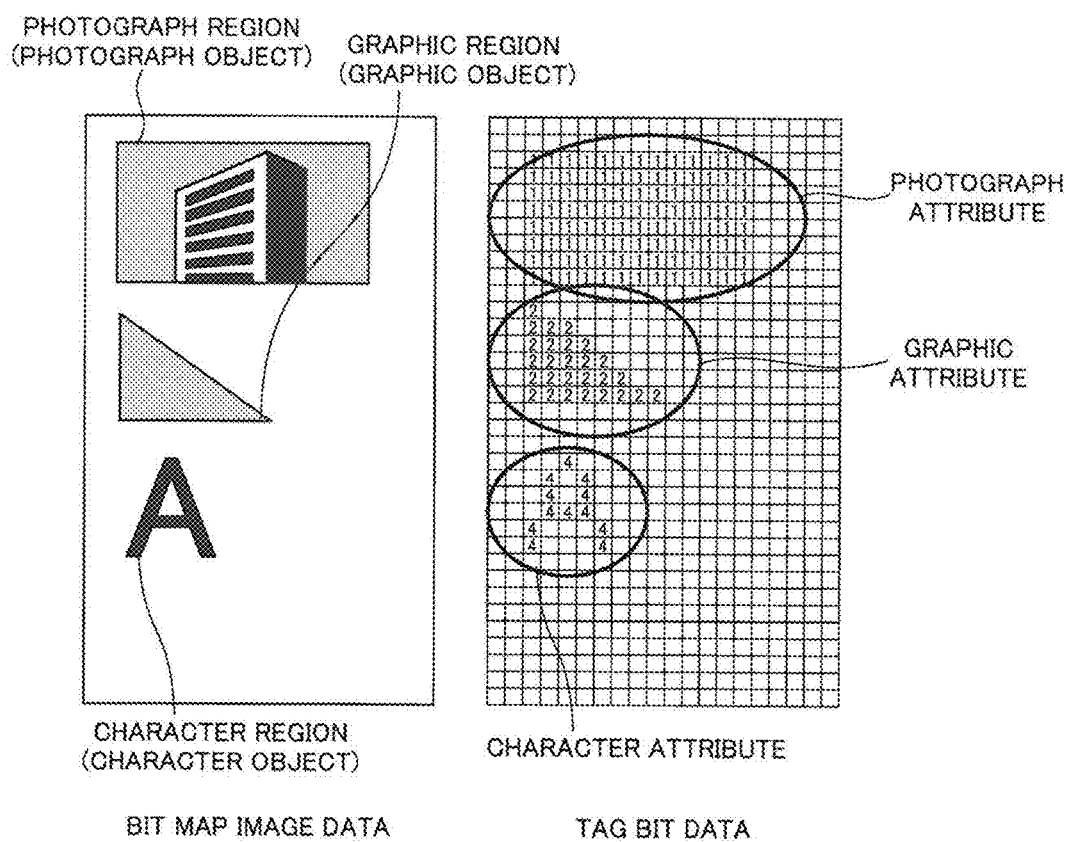
FIGS. 9A and 9B are conceptual diagrams showing a relationship example of image data and tag bit data.

FIGS. 9A and 9B are conceptual diagrams showing a relationship between the bit map image data and the tag bit data.

FIG. 9A shows an example of the bit map image data. The bit map image data is input into the print controller 32, as the color verification image. The bit map image data includes, as a photograph region, a region where the photograph data is embedded, includes, as a graphics region, a region where the graphic data is embedded, and includes, as a character region, a region where the character data such as a font is embedded. The respective regions included in the bit map image data are discriminated as a character object, a graphic object, and a photograph object, respectively.

FIG. 9B shows the tag bit data corresponding to the bit map image data illustrated in FIG. 9A. The tag bit data is data constituted of a tag bit allocated depending on the object attribute (photograph/graphics/character) of each pixel constituting the bit map image data. A tag bit indicating the photograph attribute, a tag bit indicating the graphic attribute, and a character image tag bit indicating the character attribute, denoted by, for example, "1", "2", and "4", are allocated to the photograph object, the graphic object and the character object, respectively.

[Print Job Generation Processing]

FIG. 10 is a flowchart showing an example of the print job generation processing by the print job generation portion 121 of the color verification apparatus 10 (one aspect of the color verification method).

First, the print job generation portion 121 starts the print job generation processing when detecting that a user operates the operation portion 16 to provide a color verification instruction. Then, the print job generation portion 121 determines whether or not a plurality of target information sets is registered in a selected printer, with reference to the storage portion 13 (S1) The print job generation portion 121 determines whether or not the plurality of target information sets is registered in one printer, from whether or not the plurality of target information sets is allocated to the printer.

When the plurality of target information sets is determined to be registered in the target printer in the determination processing of step S1 (YES in S1), it is determined whether or not respective profiles in the plurality of target information sets are profiles different from each other (S2). The print job generation portion 121 determines whether or not the respective target profiles in the plurality of target information sets are profiles different from each other, from whether or not the A2B table and B2A table in the device profile (FIG. 5) are the same between the profiles. Alternatively, in the case of the device link profile (FIG. 6), it is determined whether or not the CMYK-CMYK color conversion tables coincide with each other.

When the profiles in the plurality of target information sets are determined to be profiles different from each other in the determination processing of step S2 (YES in S2), the print job generation portion 121 acquires the capability of the target printer from the storage portion 13 (S3).

Here, printer setting by the color verification apparatus 10 will be explained with reference to FIG. 11.

Figure 11:
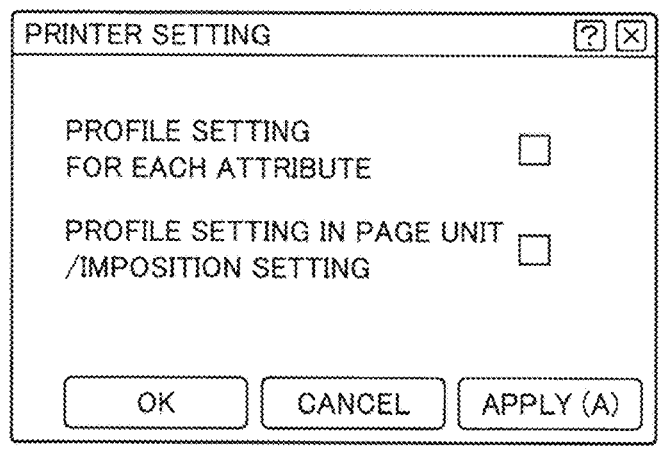
FIG. 11 is a diagram showing an example of a printer setting screen according to an embodiment of the present invention.

FIG. 11 is a diagram showing an example of a printer setting screen displayed on the display portion 15. On the printer setting screen, messages of "profile setting for each attribute" and "profile setting in a page unit/imposition setting" are displayed and check boxes are attached to the respective messages. The printer setting screen is displayed when a plurality of profiles is registered in a designated printer.

When the user operates an OK button or an application button after having input a check mark in any of the check boxes, the print job generation portion 121 stores the capability described in the selected message into the storage portion 13 in association with the target printer. Thereby, the print job generation portion 121 manages whether or not the printer can set the plurality of target profiles for each of the attribute information sets of the plurality of color charts included in the PDL data, respectively, and whether or not the printer can set the plurality of target profiles in a page unit and also perform the imposition, as the printer capability.

Returning to FIG. 10, next, the print job generation portion 121 performs preparation for the print job generation (S4). Specifically, the print job generation portion 121 performs color chart layout (allocation) on the PDL data (S4-1), and also generates an output setting of the color chart (S4-2). There can be considered two examples for the processing of the step S4, and the examples will be explained in detail through the use of FIG. 12 and FIG. 15 to be described below.

On the other hand, when the plurality of target information sets is determined not to be allocated to the target printer in the determination processing of step S1 (NO in S1), or when the profiles of the plurality of target information sets are determined to be the same profile in the determination processing of step S2 (NO in S2), one profile exists irrespective of the number of the target information sets. In this case, the number of color charts necessary for the color verification is one. Accordingly, the print job generation portion 121 performs normal output setting in the case of one color chart (S5).

Next, the print job generation portion 121 generates the print job including the PDL data in which the plurality of color charts is appropriately arranged and the output setting (S6). After the completion of the processing, the print job generation portion 121 completes the series of print job generation processing steps.

The print job generated by the print job generation portion 121 is transmitted to the target printer via the network, and image formation based on the print job is performed in the target printer.

[First Example of Print Job Generation Preparation Processing]

Then, subroutine processing of the print job generation preparation processing (S4) will be explained with reference to FIG. 12.

Figure 12:
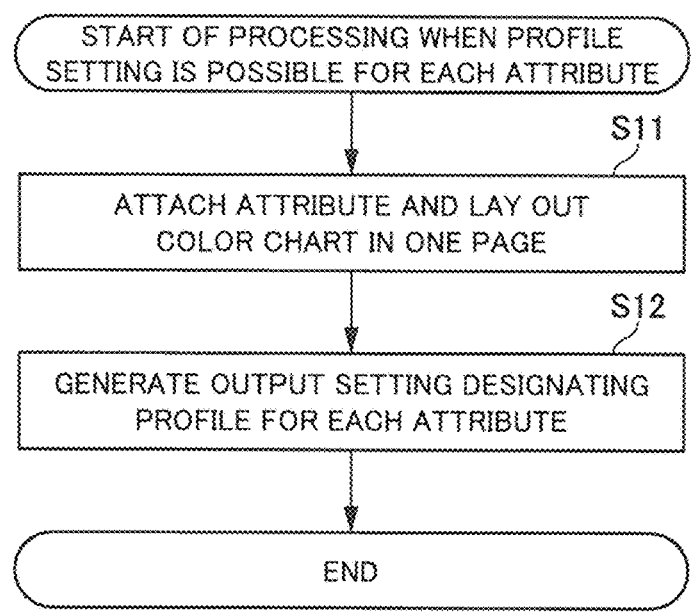
FIG. 12 is a flowchart showing a first example of print job generation preparation processing according to an embodiment of the present invention.

FIG. 12 is a flowchart showing a first example of the print job generation preparation processing (one aspect of the color verification method). The first example of the print job generation preparation processing is a processing flow when "profile setting for each attribute" is selected on the printer setting screen of FIG. 11.

First, the print job generation portion 121 attaches the attribute information indicating an image attribute to each of the plurality of color charts, and lays out the plurality of color charts on one page of the PDL data (S11).

Next, the print job generation portion 121 generates the output setting in which a profile is designated for each of the attribute information sets of the plurality of color charts (S12). The print job generation portion 121 moves to step S6 of FIG. 10 after the completion of the processing.

(Examples of the Layout and the Output Setting)

Figures 13, 14:
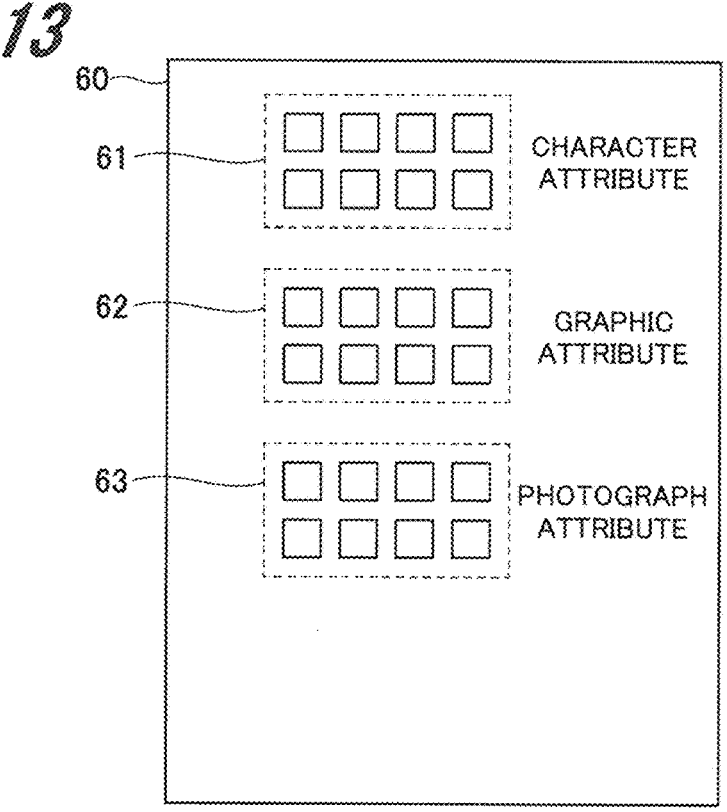
FIG. 13 is a diagram showing an arrangement example of a color chart in the first example of print job generation preparation processing according to the embodiment of the present invention.
FIG. 14 is a diagram showing a PJL output setting example in the first example of print job generation preparation processing according to the embodiment of the present invention.

FIG. 13 is a diagram showing an arrangement example of the color chart in the first example of the print job generation preparation processing.

On one page of PDL data 60, three color charts 61 to 63 for first to third target information sets (first to third target profiles) are arranged side by side in the sheet conveying direction. The character attribute, the graphic attribute, and the photograph attribute are arranged attached to the respective color charts 61 to 63.

FIG. 14 is a diagram showing an output setting example of the PJL (Print Job Language) in the first example of the print job generation preparation processing.

The description of @PJL SET TEXT="Target1" in FIG. 14 indicates that the character attribute is allocated to the first target profile. Similarly, the description of @PJL SET GRAPHICS="Target2" indicates that the graphic attribute is allocated to the second target profile, and the description of @PJL SET IMAGE="Target3" indicates that the photograph attribute is allocated to the third target profile.

[Second Example of Print Job Generation Preparation Processing]

Next, the other subroutine processing of the print job generation preparation processing (S4) will be explained with reference to FIG. 15.

Figure 15:
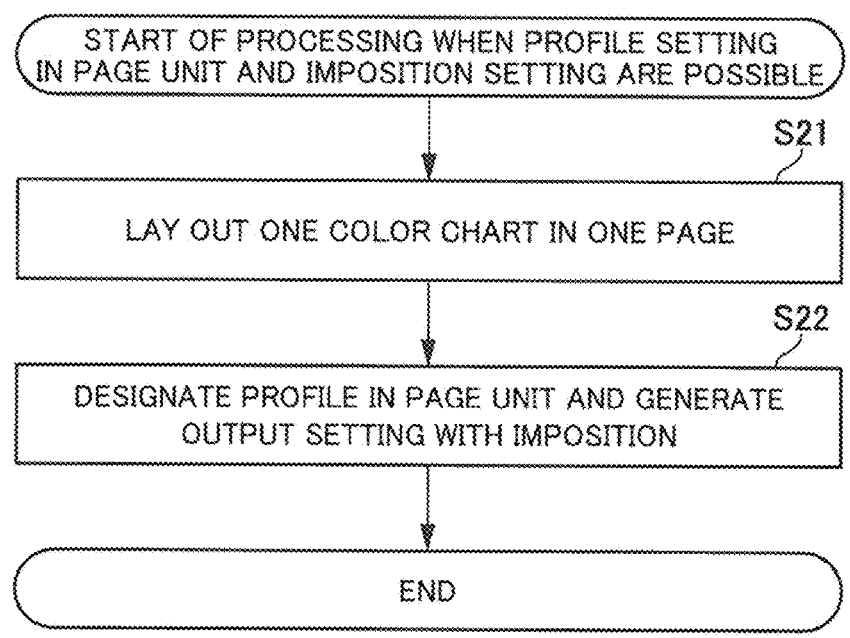
FIG. 15 is a flowchart showing a second example of print job generation preparation processing according to the embodiment of the present invention.

FIG. 15 is a flowchart showing a second example of the print job generation preparation processing (one aspect of the color verification method). The second example of the print job generation preparation processing is a processing flow when "profile setting in a page unit/imposition setting" is selected on the printer setting screen of FIG. 11.

First, the print job generation portion 121 allocates (lays out) one color chart to one page of the PDL data and generates the PDL data having a plurality of pages (S21).

Then, the print job generation portion 121 designates the profile in the page unit, and also generates job setting in which imposition is set (S22). The print job generation portion 121 moves to step S6 of FIG. 10 after completion of the processing.

(Examples of the Layout and the Output Setting)

FIG. 16 is a diagram showing an arrangement example of the color charts in the second example of the print job generation preparation processing.

A color chart 72 for a first target information (first target profile) is arranged on the first page 71 of PDL data 70. Similarly, a color chart 74 for a second target information (second target profile) is arranged on the second page 73, and a color chart 76 for a third target information (third target profile) is arranged on the third page 75. Then, the color charts 72, 74, and 76 for these respective first to third target information sets (first to third target profiles) are arranged (laid out) side by side on one page of the PDL data 70 in the sheet conveying direction.

FIG. 17 is a diagram showing an output setting example of the PJL in the second example of the print job generation preparation processing.

The description of @PJL SET PPS=1, "Target1" in FIG. 17 indicates that the first page 71 of the PDL data is allocated to the first target profile. Similarly, the description of @PJL SET PPS=2, "Target 2" indicates that the second page 73 of the PDL data is allocated to the second target profile, and the description of @PJL SET PPS=3, "Target3" indicates that the third page 75 of the PDL data is allocated to the third target profile. In addition, the description of @PJL SET IMPOSITION=4in1 indicates the imposition in which the color charts of four pages are put together within one page (4in1).

According to the example of FIG. 17, it is possible to handle the case where four or more target information sets (target profiles) are allocated to one printer. Namely, while the number of allocations is limited to the number of objects when the target profile is allocated to each of the attributes, such limitation does not exist when the target profile is allocated in the page unit.

[RIP Processing]

Next, the operation of the RIP control portion 132 in the printer 30-1 will be explained with reference to FIG. 18.

Figure 18:
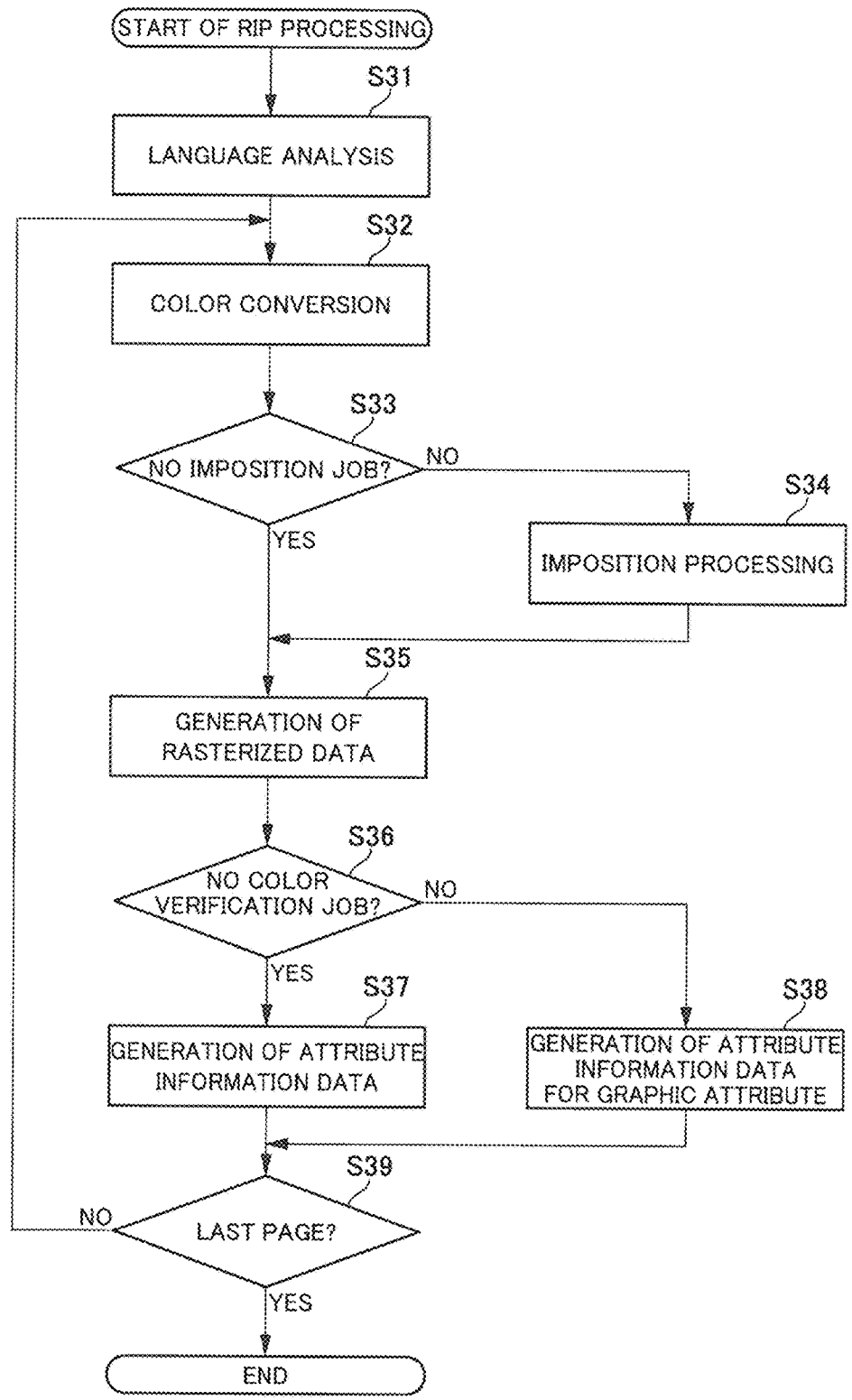
FIG. 18 is a flowchart showing RIP processing example according to an embodiment of the present invention.

FIG. 18 is a flowchart showing a RIP processing example (one aspect of the color verification method) of the RIP control portion 132 in the printer 30-1.

First, the RIP control portion 132 performs language analysis when receiving the print job from the color verification apparatus 10, and performs processing depending on the number of pages and the type of the attribute (S31). Next, the RIP control portion 132 performs the color conversion processing on the plurality of color charts arranged on the PDL page by reading out the corresponding profiles (A2B table and B2A table) in an attribute unit or in the page unit from the storage portion 34, on the basis of the language analysis result (S32).

The RIP control portion 132 determines whether or not the print job is not an imposition job (S33). Here, when the print job is not the imposition job (YES in S33), the RIP control portion 132 generates rasterized data (S35). On the other hand, when the print job is the imposition job (NO in S33), the RIP control portion 132 performs imposition processing (S34), and then moves to step S35 to generate the rasterized data.

Next, it is determined whether or not the print job is not the color verification job (S36). When the print job is not the color verification job (YES in S36), the RIP control portion 132 generates the attribute information data (tag bit data) in which the attribute is allocated on the basis of an object type included in a document instructed to be printed (S37). Thereby, there is generated the attribute information data not based on the color chart, but based on the object type included in the document instructed to be printed.

On the other hand, when the print job is the color verification job (NO in S36), the RIP control portion 132 generates the attribute information data in which the attribute information in each of the color charts is changed to the graphics information (S38). While the profile information is allocated to the attribute information, the graphic attribute is attached to the color chart by the allocation, and the color chart is output onto a sheet as a graphics. Then, the RIP control portion 132 outputs, to the print engine 33, the rasterized data on which the plurality of color charts after the color conversion is laid out and the attribute information of the graphic attribute.

Next, the RIP control portion 132 determines whether or not the page is the last page of the PDL data (S39), and when the current page is not the last page (NO in S39), the step moves to step S32. On the other hand, when the page is the last page (YES in S39), the RIP control portion 132 completes the series of RIP processing steps after the completion of all the pages.

[Examples of Rasterized Data and Attribute Information Data]

Figure 19:
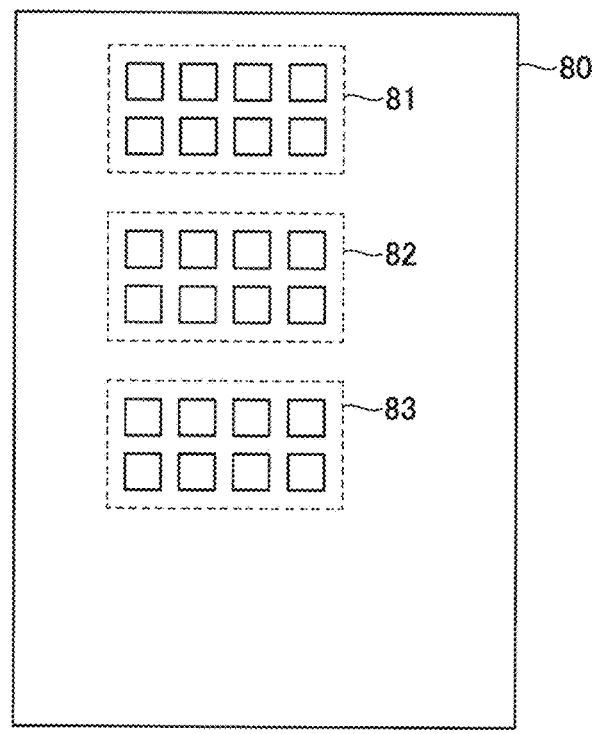
FIG. 19 is a diagram showing an example of rasterized data according to an embodiment of the present invention.

FIG. 19 is a diagram showing an example of the rasterized data according to an embodiment of the present invention.

FIG. 19 illustrates an image (rasterized data) formed on a sheet 80. The rasterized data including color charts 81 to 83 as shown in FIG. 19 is generated from either the PDL data 60 (FIG. 13) or the PDL data 70 (FIG. 16).

Figure 20:
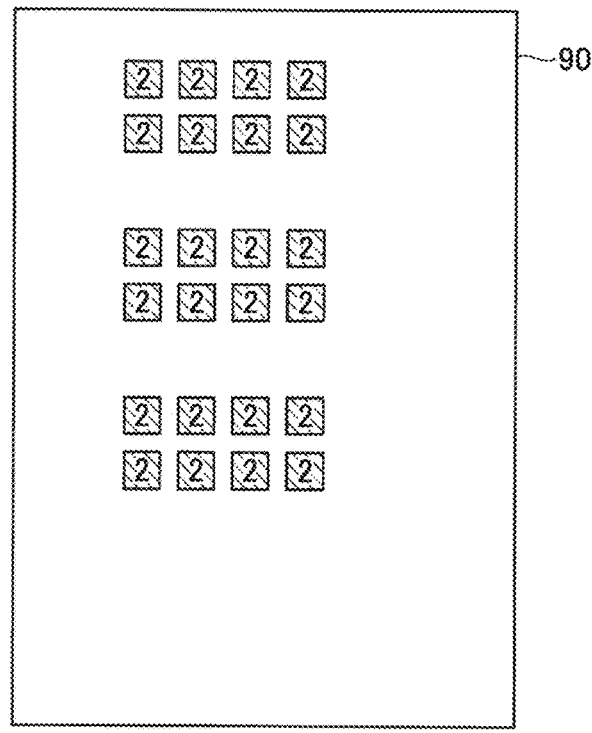
FIG. 20 is a diagram showing an example of attribute information data according to an embodiment of the present invention.

FIG. 20 is a diagram showing an example of the attribute information data (tag bit data) according to an embodiment of the present invention.

FIG. 20 shows attribute information data 90 for the rasterized data formed on the sheet 80 of FIG. 19. In the attribute information data 90, a graphic attribute "2" is allocated to each pixel corresponding to the first color chart 81 to the third color chart 83 of FIG. 19.

[Color Verification Processing]

Next, the color verification operation in the color verification apparatus 10 will be explained with reference to FIG. 21.

Figure 21:
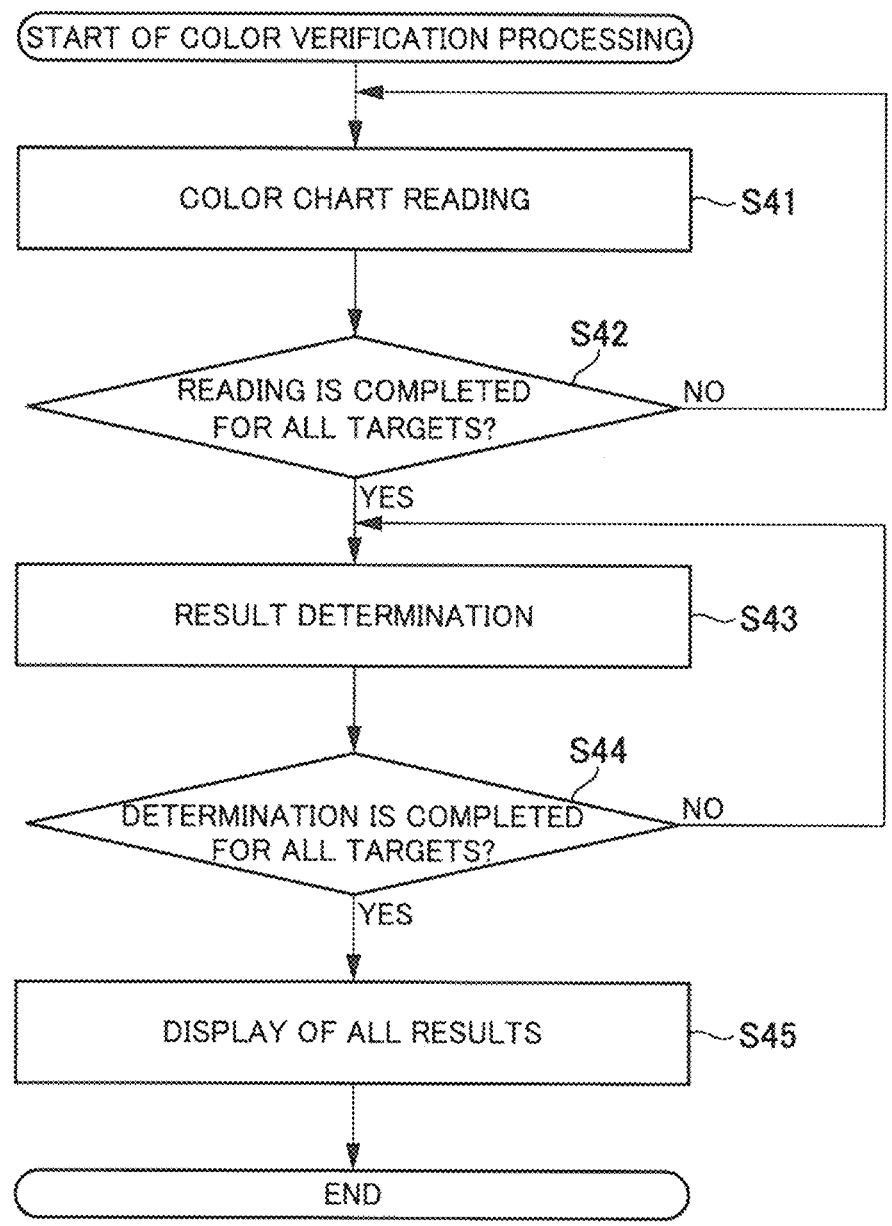
FIG. 21 is a flowchart showing a color verification processing example according to an embodiment of the present invention.

FIG. 21 is a flowchart showing a color verification processing example (one aspect of the color verification method) by the color verification control portion 122 in the color verification apparatus 10.

The color verification control portion 122 controls the operation of the colorimeter 20 via the colorimeter control portion 123 to thereby perform reading of the color chart (color verification patch) formed on the sheet (S41). The color verification control portion 122 repeats the reading of the color chart until the reading of all the target color charts (color verification targets) is completed (S42). Next, the color verification control portion 122 performs the determination of the colorimetry result by the colorimeter 20 through the use of the color difference allowance width ΔE in the target information (S43). The color verification control portion 122 repeats the determination until the determination of colorimetry results for all the color charts is completed (S44). Then, when the determination of the colorimetry results for all the color charts is completed, the color verification control portion 122 displays the determination results of all the color charts on the display portion (S45). At this time, the color verification control portion 122 may display the determination results of all the color charts on one screen, and may display the determination result of one color chart on one screen.

According to the above embodiment, it is possible to form a plurality of color verification images on the same sheet by using different target profiles, and thus it is possible to verify the plurality of target profiles at the same time. Accordingly, it becomes possible to perform reduction in the number of sheets, in click charge, and in work time.

2. Other Embodiments

Although the above embodiment has been explained by using, as an example, the case where the color verification apparatus 10 is disposed on the PC, the print job generation portion 121 and the color verification control portion 122 may be disposed on a server connected to a network.

In addition, in the above embodiment, the print controller included in the printer may be separated from the printer and be configured as a portion separately from the printer.

Furthermore, the above embodiment can be also applied to a color printer using RGB or another color other than the CMYK printer, for the color printer.

Moreover, it is needless to say that the present invention is not limited to each of the above exemplary embodiments and includes other various application examples and modifications without departing from the gist of the present invention described in claims.

For example, the above exemplary embodiments explain the apparatus and the system configuration in detail and concretely for clear explanation of the present invention, and are not necessarily limited to an apparatus provided with all the explained configurations. In addition, it is possible to replace a part of the configuration in some exemplary embodiment with a configuration in another exemplary embodiment. Furthermore, it is also possible to add a configuration of another exemplary embodiment to the configuration of some exemplary embodiment. Moreover, it is also possible to perform addition, deletion, and replacement of another configuration as to a part of the configuration in each of the exemplary embodiments.

Additionally, a part or the whole of each of the above configurations, functions, processing portions, processing procedures and the like may be realized using hardware by designing or the like of, for example, an integrated circuit. Furthermore, each of the above configurations, functions, and the like may be realized using software in which a processor interprets and executes a program that realizes each of the functions. Information such as a program, a table, a file, or the like which realizes each of the functions can be placed in: a recording apparatus such as a memory, a hard disk, or an SSD (Solid State Drive); or can be placed on a recording medium such as an IC card, an SD card, or a DVD.

Moreover, only the control lines or the information lines considered to be required for explanation are indicated, and all the control lines or information lines in a product are not always indicated. Actually, it may be considered that almost all the configurations are connected to each other.

In addition, in the present specification, the processing steps describing time-series processing include not only the processing performed in a time-series manner along the described sequence, but also the processing executed in parallel or individually (e.g., parallel processing or processing by an object) even when not always being executed in a time-series manner.

REFERENCE SIGNS LIST 1 color verification system
10 color verification apparatus (information processing apparatus)
20 colorimeter
12 control portion
121 print job generation portion
122 color verification control portion
123 colorimeter control portion
124 printer control portion
30 printer group
30-1 printer (image forming apparatus)
32 print controller
33 print engine
34 storage portion
35 tag bit plane
36 CMYK plane
40 target information
41 target profile
42 color chart
43 color difference allowance width
50-1 to 50-3 first to third target information
51A, 51B, 51C target profile
52A color chart
53A color difference allowance width
60 PDL data
61 to 63 color chart
70 PDL data
71 first page
72 color chart
73 second page
74 color chart
75 third page
76 color chart
80 sheet
81 to 83 color chart
90 attribute information data

What is claimed is:

1. A color verification system including:
an information processing apparatus that generates a job;
an image forming apparatus that forms a color image on a sheet on the basis of the job;
a colorimeter configured to perform colorimetry of the color image on the sheet after the sheet is output by the image forming apparatus; and
the information processing apparatus comprising:
a storage portion configured to store: information of the image forming apparatus under management of the information processing apparatus; and target information including a target profile set to the image forming apparatus; and
a job generation portion configured to generate, when a plurality of different target profiles is set to the image forming apparatus, the job: including image data containing a plurality of color verification images associated with the plurality of target profiles, respectively; and including an output setting, wherein
the image forming apparatus forms the plurality of color verification images associated with the plurality of target profiles on a single sheet based on the job generated by the job generation portion, and
the colorimeter is configured to perform colorimetry of the plurality of color verification images associated with the plurality of target profiles on the single sheet to verify the plurality of different target profiles at the same time.

2. The color verification system according to claim 1, wherein,
in the generation of the job, the job generation portion generates the image data in which the plurality of color verification images provided with attribute information sets indicating image attributes is laid out, and also the output setting in which the plurality of target profiles is set for each of the attribute information sets of the plurality of color verification images.

3. The color verification system according to claim 2, wherein
the image forming apparatus includes a control portion that performs color conversion for each of the plurality of color verification images laid out on the image data by applying the corresponding target profile, when the job is input from the information processing apparatus, and that also outputs, after changing the attribute information sets for the plurality of color verification images after the color conversion to graphic attributes, the image data on which the plurality of color verification images after the color conversion is laid out and the attribute information sets of the graphic attributes, and
an image forming portion that forms the plurality of color verification images after the color conversion on a sheet, on the basis of the image data on which the plurality of color verification images after the color conversion is laid out and the attribute information sets of the graphic attributes, which are input from the control portion.

4. The color verification system according to claim 1, wherein
the information processing apparatus generates the image data by allocating one color verification image to one page, and sets the plurality of target profiles in a page unit and also generates the output setting in which imposition is set.

5. The color verification system according to claim 1, wherein
the target information includes at least the target profile, the color verification images, and a color difference allowance width.

6. The color verification system according to claim 2, wherein
each of the attributes is a character attribute, a graphic attribute, or a photograph attribute.

7. The color verification system according to claim 2, wherein
the job generation portion manages whether or not the plurality of target profiles can be set for each of the attribute information sets of the plurality of color verification images, and whether or not the plurality of target profiles can be set in a page unit and also imposition can be set, as a capability of the image forming apparatus.

8. The color verification system according to claim 7, wherein
the information processing apparatus manages a capability of a single image forming apparatus or an image forming apparatus group constituted of a plurality of image forming apparatuses, under management of the information processing apparatus.

9. A non-transitory computer-readable recording medium storing a program in a color verification system including: an information processing apparatus that generates a job; an image forming apparatus that forms a color image on a sheet on the basis of the job; and a colorimeter configured to perform colorimetry on the color image on the sheet after the sheet is output by the image forming apparatus, the program causing a computer included in the information processing apparatus to execute processing comprising the processes of:
storing information of the image forming apparatus under management of the information processing apparatus and target information including a target profile set to the image forming apparatus;
determining whether or not a plurality of different target profiles is set to the image forming apparatus; and
generating the job including, when a plurality of different target profiles is set to the image forming apparatus, image data containing a plurality of color verification images associated with the plurality of target profiles, respectively, and an output setting, wherein the image forming apparatus forms the plurality of color verification images associated with the plurality of target profiles on a single sheet based on the job generated and the colorimeter performs colorimetry of the plurality of color verification images associated with the plurality of target profiles on the single sheet to verify the plurality of different target profiles at the same time.

10. The non-transitory computer-readable recording medium storing the program according to claim 9, wherein,
the generating the job generates the image data on which the plurality of color verification images provided with attribute information sets indicating image attributes is laid out, and also generates the output setting which sets the plurality of target profiles for each of the attribute information sets of the plurality of color verification images.

11. The non-transitory computer-readable recording medium storing the program according to claim 9, wherein
the image data is generated by allocating one of the color verification images to one page, and the plurality of target profiles is set in a page unit and also the output setting in which imposition is set is generated.

12. The non-transitory computer-readable recording medium storing the program according to claim 9, wherein
the target information includes at least the target profile, the color verification images, and a color difference allowance width.

13. The non-transitory computer-readable recording medium storing the program according to claim 10, wherein
each of the attributes is a character attribute, a graphic attribute, or a photograph attribute.

14. The non-transitory computer-readable recording medium storing the program according to claim 10, wherein
management whether or not the plurality of target profiles can be set for each of the attribute information sets of the plurality of color verification images, and whether or not the plurality of target profiles can be set in a page unit and also imposition can be set, as a capability of the image forming apparatus, is performed.

15. The non-transitory computer-readable recording medium storing the program according to claim 14, wherein
a capability of a single image forming apparatus or an image forming apparatus group constituted of a plurality of image forming apparatuses, under management of the information processing apparatus is managed.

* * * * *